US010868826B2

(12) United States Patent
Giura et al.

(10) Patent No.: US 10,868,826 B2
(45) Date of Patent: *Dec. 15, 2020

(54) SECURE BROWSING VIA A TRANSPARENT NETWORK PROXY

(71) Applicant: AT&T Intellectual Property I, L.P., Atlanta, GA (US)

(72) Inventors: Paul Giura, Cairo, NY (US); Jeffrey E. Bickford, Somerset, NJ (US); Donald E. Hendrix, Mill Creek, WA (US); Howard F. Shirokmann, Point Pleasant, NJ (US); Thomas A. Anschutz, Conyers, GA (US); Ching C. Shih, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

This patent is subject to a terminal disclaimer.

(21) Appl. No.: 16/260,420

(22) Filed: Jan. 29, 2019

(65) Prior Publication Data

US 2019/0158531 A1 May 23, 2019

Related U.S. Application Data

(63) Continuation of application No. 15/808,228, filed on Nov. 9, 2017, now Pat. No. 10,200,403, which is a
(Continued)

(51) Int. Cl.
*H04L 29/06* (2006.01)
*G06F 9/455* (2018.01)
*H04L 29/08* (2006.01)

(52) U.S. Cl.
CPC ...... *H04L 63/1441* (2013.01); *G06F 9/45558* (2013.01); *H04L 63/0245* (2013.01);
(Continued)

(58) Field of Classification Search
CPC ............ G06F 9/45533; G06F 9/45545; G06F 9/45558; G06F 2009/45587;
(Continued)

(56) References Cited

U.S. PATENT DOCUMENTS

| 5,781,550 A | 7/1998 | Templin et al. |
| 6,101,510 A * | 8/2000 | Stone ...................... H04L 29/06 715/234 |

(Continued)

FOREIGN PATENT DOCUMENTS

CN 102497425 6/2012

OTHER PUBLICATIONS

De Ryck et al. "CsFire: Transparent client-side mitigation of malicious cross-domain requests." Engineering Secure Software and Systems. Springer Berlin Heidelberg, 2010. 18-34. https://lirias.kuleuven.be/bitstream/123456789/260893/1/pape.
(Continued)

*Primary Examiner* — Kevin Bechtel
(74) *Attorney, Agent, or Firm* — Guntin & Gust, PLC; Atanu Das

(57) ABSTRACT

A system for providing secure browsing via a transparent network proxy is disclosed. The system may receive, from a client, a request to access a resource. The request may include an identifier that may be utilized to locate the resource. Once the request is received, the system may determine if the resource is not trusted, such as if the identifier is determined to be unknown or suspicious. If the resource is determined to not be trusted by the system, the system may forward the request to a virtual machine manager that may select a browser virtual machine from a pool of browser virtual machines. After the browser virtual machine is selected, the browser virtual machine may stream a rendering of the resource to the client based on the request.
(Continued)

The rendering of the resource may be provided in lieu of the actual resource.

20 Claims, 6 Drawing Sheets

Related U.S. Application Data continuation of application No. 15/353,174, filed on Nov. 16, 2016, now Pat. No. 9,882,928, which is a continuation of application No. 14/094,258, filed on Dec. 2, 2013, now Pat. No. 9,537,885.

(52) U.S. Cl.
CPC ........ H04L 63/0281 (2013.01); H04L 63/101 (2013.01); H04L 67/02 (2013.01); *G06F 2009/45587* (2013.01); *G06F 2009/45595* (2013.01)

(58) Field of Classification Search
CPC ........... G06F 2009/45595; G06F 21/53; H04L 29/06551–06625; H04L 29/06911–06918; H04L 29/06931; H04L 29/06979; H04L 63/0227–0263; H04L 63/0281; H04L 63/101; H04L 63/1441; H04L 63/145; H04L 63/1466; H04L 63/20–205; H04L 67/02; H04L 67/42
See application file for complete search history.

(56) References Cited

U.S. PATENT DOCUMENTS

| | | | |
|---|---|---|---|
| 7,146,305 | B2 | 12/2006 | Van |
| 7,370,360 | B2 | 5/2008 | Van |
| 7,832,012 | B2 | 11/2010 | Huddleston |
| 8,104,083 | B1 | 1/2012 | Sobel et al. |
| 8,196,205 | B2 | 6/2012 | Gribble et al. |
| 8,402,529 | B1 | 3/2013 | Green et al. |
| 8,407,785 | B2 | 3/2013 | Sidiroglou et al. |
| 8,429,743 | B2 | 4/2013 | Loveland et al. |
| 8,452,956 | B1 | 5/2013 | Kersey et al. |
| 8,468,344 | B2 | 6/2013 | Teijido et al. |
| 8,555,391 | B1 * | 10/2013 | Demir .................... H04L 67/02 726/24 |
| 8,560,826 | B2 | 10/2013 | Wu et al. |
| 2003/0159070 | A1 | 8/2003 | Mayer et al. |
| 2007/0136579 | A1 | 6/2007 | Levy et al. |
| 2007/0245032 | A1 | 10/2007 | KishorVarshney et al. |
| 2007/0294744 | A1 | 12/2007 | Alessio et al. |
| 2008/0184129 | A1 * | 7/2008 | Cancel ................... G06Q 30/02 715/741 |
| 2009/0125902 | A1 | 5/2009 | Ghosh et al. |
| 2010/0088699 | A1 | 4/2010 | Sasaki |
| 2010/0192224 | A1 * | 7/2010 | Ferri ...................... G06F 21/53 726/23 |
| 2011/0113427 | A1 | 5/2011 | Dotan |
| 2011/0191849 | A1 | 8/2011 | Jayaraman et al. |
| 2012/0054744 | A1 | 3/2012 | Singh et al. |
| 2013/0036470 | A1 | 2/2013 | Zhu et al. |
| 2013/0055256 | A1 | 2/2013 | Banga et al. |
| 2013/0125238 | A1 | 5/2013 | Crawford |
| 2017/0078411 | A1 * | 3/2017 | Hayden ............... G06F 9/45558 |

OTHER PUBLICATIONS

Kennedy, An architecture for secure, client-driven deployment of application-specific proxies. Diss. Master Thesis in Computer Science, University of Waterloo, 2000. http://ccnga.uwaterloo.ca/publications/pdfs/djkennedy.pdf.

* cited by examiner

ABSTRACT# SECURE BROWSING VIA A TRANSPARENT NETWORK PROXY

CROSS-REFERENCES TO RELATED APPLICATIONS

This application is a continuation of and claims priority to U.S. patent application Ser. No. 15/808,228, filed Nov. 9, 2017, which is a continuation of and claims priority to U.S. patent application Ser. No. 15/353,174, filed Nov. 16, 2016, now U.S. Pat. No. 9,882,928, which is a continuation of and claims priority to U.S. patent application Ser. No. 14/094,258, filed Dec. 2, 2013, now U.S. Pat. No. 9,537,885, each of which are hereby incorporated by reference in their entireties.

FIELD OF THE INVENTION

The present application relates to computer security and browsing technologies, and more particularly, to a system and method for providing secure browsing via a transparent network proxy.

BACKGROUND

Currently, users utilize network and other service providers to gain access to the Internet, access software services, request and receive various types of content, access software applications, and perform a variety of other tasks and functions. In order to do so, such users often utilize browsers or other software applications on computing devices, such as, but not limited to, personal computers, laptops, smartphones, tablets, phablets, and other devices to access such services, content, and applications. However, as users have become increasingly comfortable with using such technologies, malware such as, but not limited to, computer viruses, worms, trojan horses, keyloggers, spyware, adware, and other malicious programs has also similarly increased. Such malware is often utilized by malware developers, fraudsters, and hackers to disrupt communications and to compromise personal, financial or other information associated with users and companies. Additionally, malware often disrupts communications and compromises information without the users or companies even knowing that such intrusions have taken place. As an example, a user may unknowingly visit a malicious website, and the user's device may be infected with malware without any warning or without the user's explicit consent. The malware may then be utilized by fraudsters to access the user's personal information, such as, but not limited to, social security information, financial information, driver's license information, or other personal information. Fraudsters may utilize such information to steal user identities, sign users up for fraudulent or even legitimate services without the user's consent, or perform a host of other fraudulent activities.

Many of the current malware attacks rely on tricking users into navigating to unknown uniform resource locators (URLs) that host zero-day exploits and drive-by-download attacks. Notably, such zero-day exploits and attacks are typically undetected by conventional anti-virus and anti-malware technologies, and are often capable of compromising many users' devices, personal accounts, and information in rapid fashion. In order to mitigate this problem, one solution is to use a proxy to block unknown, suspicious, and potentially compromised URLs. However, such proxies often do not have information about every URL that exists on the Internet or elsewhere, and, as a result, such a solution dramatically reduces a user's ability to browse many unknown URLs that are actually benign in nature. As another possible solution, a warning web page may be displayed on a user's internet browser whenever a user attempts to navigate to an unknown URL. Such warning web pages typically require some interaction with or acceptance from the user before the users proceed to the intended destination. While this solution often provides some awareness of potential malware to the user, the security decision is still placed on the user. By placing the security decision for proceeding on the user, this provides the user with the opportunity to accept the risk of proceeding and to navigate to a potentially malicious website that is associated with the URL.

SUMMARY

Systems and accompanying methods for providing secure browsing via a transparent network proxy are disclosed. Notably, the systems and methods may provide users with the option to securely browse unknown or suspicious URLs or destinations through the use of the transparent network proxy, virtual browser machines, and desktop virtualization technologies, while also ensuring that the users' devices remain uncompromised. In particular, when a user of an enterprise or other similar network sends a request to navigate to a particular URL or destination using a browser or other similar application, the systems and methods may include utilizing the transparent network proxy to determine if the URL or destination is unknown, suspicious, otherwise untrustworthy, or a combination thereof. If the transparent network proxy determines that that URL or destination is known, not suspicious, trustworthy, or a combination thereof, the systems and methods may include allowing the user's browser or other similar application to directly access and render a resource associated with the URL or destination in a traditional fashion. However, if the transparent network proxy determines that the URL or destination is unknown, suspicious, untrustworthy, or a combination thereof, then the systems and methods may include providing the user with the option to securely browse the resource associated with the URL. If the user selects this option, the transparent network proxy may forward the user's request to a virtual machine manager to further process the request.

Once the request is forwarded to the virtual machine manager, the system and methods may include having the virtual machine manager select a browser virtual machine from a pool of available browser virtual machines to render the resource associated with the URL or destination. Also, the systems and methods may include redirecting the user's browser or other similar application to a desktop virtualization connection, such as a remote desktop-like connection, with the selected browser virtual machine. Once the desktop virtualization connection is established between the user's browser and the selected browser virtual machine, the browser virtual machine may stream the rendered resource associated with the URL to the user's browser or other similar application. The rendered resource may be displayed or otherwise presented within a portion of the user's browser using the desktop virtualization connection to provide a virtual browser that provides a similar user experience as if the user was directly accessing the resource using the user's browser without the use of the browser virtual machine. In this way, the software code that has to be run in order to render the resource will be loaded and executed within the browser virtual machine itself. Therefore, any potential malware that may be embedded in the resource will only be downloaded and installed on the browser virtual machine and not on the user's device.

In certain embodiments, the selected browser virtual machine may be configured to have no access to any data within the user's enterprise network or the user's device. This may prevent potential malware attacks from effectively compromising enterprise data or other user data. Once the user is done accessing the rendered resource, the user may close the browser that is displaying the rendered resource. When the browser is closed, the systems and methods may include rebooting the selected browser virtual machine and releasing the browser virtual machine back into the pool of available browser virtual machines. Notably, because the browser virtual machine may be rebooted after rendering each page of the resource from a fresh image, the browser virtual machine may not contain any persistent malware. Furthermore, by using the architecture provided by the systems and methods, the user's browsing experience may not be affected, and usage of the virtual browser may be transparent.

In one embodiment, a system for providing secure browsing via a transparent network proxy is disclosed. The system may include a memory that stores instructions and a processor that executes the instructions to perform various operations of the system. The system may receive, from a user device, a request to access a resource. The request may include an identifier that is utilized for locating the resource. Once the request to access the resource is received, the system may determine if the resource is not trusted based on an analysis of the identifier. If the system determines that the resource is not trusted based on the analysis of the identifier, the system may forward the request to access the resource to a virtual machine manager for selecting a browser virtual machine from a pool of browser virtual machines. A stream including a rendering of the requested resource may be streamed from the selected browser virtual machine to the user device based on the request. Notably, the rendering of the resource may be provided in lieu of the actual resource itself.

In another embodiment, a method for providing secure browsing via a transparent network proxy is disclosed. The method may include utilizing a memory that stores instructions, and a processor that executes the instructions to perform the various functions of the method. Specifically, the method may include receiving, from a user device, a request to access a resource. The request may include an identifier that is utilized for locating the resource. Additionally, the method may include determining if the resource is not trusted, such as if the identifier is unknown or suspicious. Furthermore, the method may include forwarding, if the resource is determined to not be trusted based on an analysis of the identifier, the request to a virtual machine manager for selecting a browser virtual machine from a pool of browser virtual machines. Then, a stream including a rendering of the resource may be streamed from the selected browser virtual machine to the user device based on the request. Finally, the rendering of the resource may be provided in lieu of the actual resource itself.

According to yet another embodiment, a computer-readable device having instructions for providing secure browsing via a transparent network proxy is provided. The computer instructions, which when loaded and executed by a processor, may cause the processor to perform operations including: receiving, from a user device, a request to access a resource, wherein the request includes an identifier for locating the resource; determining if the resource is not trusted based on an analysis of the identifier; and forwarding, if the resource is determined to not be trusted based on the analysis of the identifier, the request to a virtual machine manager for selecting a browser virtual machine from a pool of browser virtual machines, wherein a stream including a rendering of the resource is streamed from the browser virtual machine to the user device based on the request, and wherein the rendering of the resource is provided in lieu of the resource.

These and other features of the systems and methods for providing secure browsing via a transparent network proxy are described in the following detailed description, drawings, and appended claims.

DETAILED DESCRIPTION OF THE INVENTION

Figure 1:
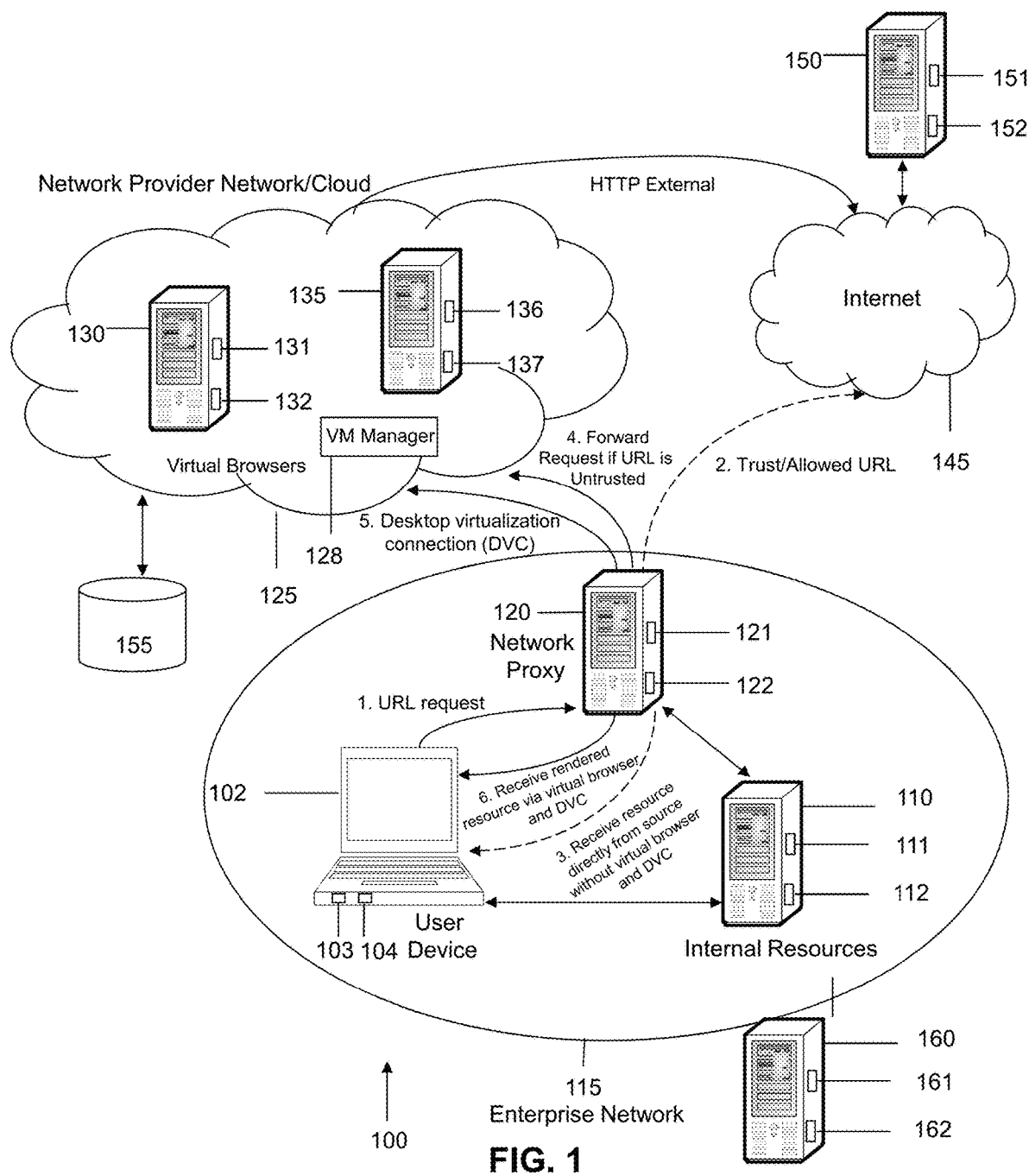
FIG. 1 is a schematic diagram of a system for providing secure browsing via a transparent network proxy according to an embodiment of the present disclosure.

A system 100, a system 200, and accompanying methods for providing secure browsing via a transparent network proxy 120 are disclosed, such as shown in FIGS. 1-5. In particular, the system 100, the system 200, and methods may provide users with the option to securely browse unknown or suspicious URLs or destinations by using the transparent network proxy 120, browser virtual machines, and desktop virtualization technologies, while also ensuring that the users' device 102 remains uncompromised. In particular, when a user of an enterprise network 115 or other similar network sends a request to navigate to a particular URL or destination using a browser or other similar application on the user device 102, the system 100, the system 200, and the methods may include utilizing the transparent network proxy 120 to determine if the URL or destination is unknown, suspicious, otherwise untrustworthy, or a combination thereof. If the transparent network proxy 120 determines that that URL or destination is known, not suspicious, trustworthy, or a combination thereof, the system 100, system 200, and methods may include allowing the user's browser or other similar application to directly access and render a resource associated with the URL or destination in a traditional fashion.

However, if the transparent network proxy 120 determines that the URL or destination is unknown, suspicious, untrustworthy, or a combination thereof, then the system 100, system 200, and methods may include providing the user with an option to securely browse the resource associated with the URL. If the user selects this option, the transparent network proxy 120 may forward the user's request to a virtual machine manager 128 to process the request further. Once the request is forwarded to the virtual machine manager 128, the system 100, system 200, and methods may include having the virtual machine manager 128 select a browser virtual machine from a pool of available browser virtual machines to render the resource associated with the URL or destination. Also, the system 100, system 200, and methods may include redirecting the user's browser or other similar application to a desktop virtualization connection, such as a remote desktop-like connection, with the selected browser virtual machine.

After the desktop virtualization connection is established between the user's browser and the selected browser virtual machine, the browser virtual machine may stream the rendered resource associated with the URL to the user's browser or other similar application. Notably, the rendered resource may be displayed within a portion of the user's browser using the desktop virtualization connection so as to provide a virtual browser to the user. In certain embodiments, the virtual browser may provide the same or similar user experience as if the user was directly accessing the resource using the user's regular browser. However, the software code that is utilized to render the resource may reside and be executed only within the browser virtual machine so that any potential malware that is embedded within the resource may only be downloaded and installed on the browser virtual machine and not on the user device 102.

In certain embodiments, the selected browser virtual machine may be prevented from accessing any data within the user's enterprise network 115 or within the user's device 102 so as to prevent potential malware attacks from compromising any data within the enterprise network 115. After the user is done accessing the rendered resource or at any other selected time, the user may close the browser that is displaying the rendered resource. Once the browser is closed, the system 100, the system 200, and methods may include rebooting the selected browser virtual machine and releasing the browser virtual machine back into the pool of available browser virtual machines. Since the browser virtual machine may be rebooted from a fresh image after rendering each page of the resource, the browser virtual machine may not contain any persistent malware. Additionally, the browser virtual machine may be configured using special techniques, such as preventing unknown software from executing that may prevent malware from altering the browser virtual machine. Furthermore, the user's browsing experience may not be affected, and usage of the virtual browser may be transparent to the user.

Referring to the drawings and in particular to FIG. 1, the system 100 may provide secure browsing via a transparent network proxy 120. The system 100 may be configured to support, but is not limited to supporting, content delivery services, cloud computing services, voice-over-internet protocol services (VoIP), software as a service (SaaS) applications, gaming applications and services, productivity applications and services, mobile applications and services, and any other computing applications and services. Additionally, the system 100 may include one or more users that may utilize user device 102 to access content, data, and services provided by sources of content, such as content source device 150. In certain embodiments, the user device 102 and the content source device 150 may be computers, servers, mobile devices, smartphones, computer tablets, phablets, or any other computing devices. In one embodiment, the user device 102 may include a memory 103 that includes instructions, and a processor 104 that executes the instructions from the memory 103 to perform various operations that are performed by the user device 102. The processor 104 may be hardware, software, or a combination thereof. Similarly, the content source device 150 may include a memory 151 that includes instructions, and a processor 152 that executes the instructions from the memory 151 to perform various operations that are performed by the content source device 150. The processor 152 may be hardware, software, or a combination thereof. Additionally, the system 100 may incorporate virtualization techniques that may be facilitated through the use of a hypervisor, such as hypervisor 610, and the virtualization techniques may allow the system 100 to more easily replace an operating system of the system 100. For example, virtual machine manager 128 may select an image of a browser virtual machine to run, and may load the image into the hypervisor 610, which may allow for the expeditious replacement of browser virtual machines in the system 100.

The user device 102 of the system 100 may reside within an enterprise network 115 or other similar network. However, in other embodiments, the user device 102 may be within any network, such as, but not limited to, the internet 145 and the network provider network 125. In addition to the user device 102, the enterprise network 115 may include the transparent network proxy 120 and one or more internal resource servers 112. In some embodiments, the transparent network proxy 120 may be located in other networks, such as, but not limited to, network provider network 125. In certain embodiments, the enterprise network 115 may be a private network, such as a virtual private network, utilized to connect each of the devices within the enterprise network 115 to one another in a secure fashion. The enterprise network 115 may employ any number of virtual private network protocols, such as, but not limited to, Internet Protocol Security (IPsec), Transport Layer Security (SSL/TLS), Secure Shell (SSH), or any other type of virtual private network protocol. Additionally, in certain embodiments, the enterprise network 115 may include and be connected to a mobile network, a wireless network, an Ethernet network, a satellite network, a broadband network, a cellular network, any type of private network, a cable network, the Internet 145, an internet protocol network, a multiprotocol label switching (MPLS) network, a content distribution network, or any combination thereof. In further embodiments, the enterprise network 115 may be part of a single autonomous system that is located in a particular geographic region, or be part of multiple autonomous systems that span several geographic regions.

Notably, the enterprise network 115 may utilize encryption algorithms to protect data traffic that traverses the enterprise network 115 from eavesdropping by devices or users outside the enterprise network 115. In one embodiment, the enterprise network 115 may only allow users that have been authenticated by the enterprise network 115 to access the enterprise network 115. Data within the enterprise network 115 may be kept private from devices outside the enterprise network 115, devices unauthenticated by the enterprise network 115, or a combination thereof. In certain embodiments, the enterprise network 115 may be configured to transmit, generate, and receive any information and data traversing the enterprise network 115.

Figure 6:
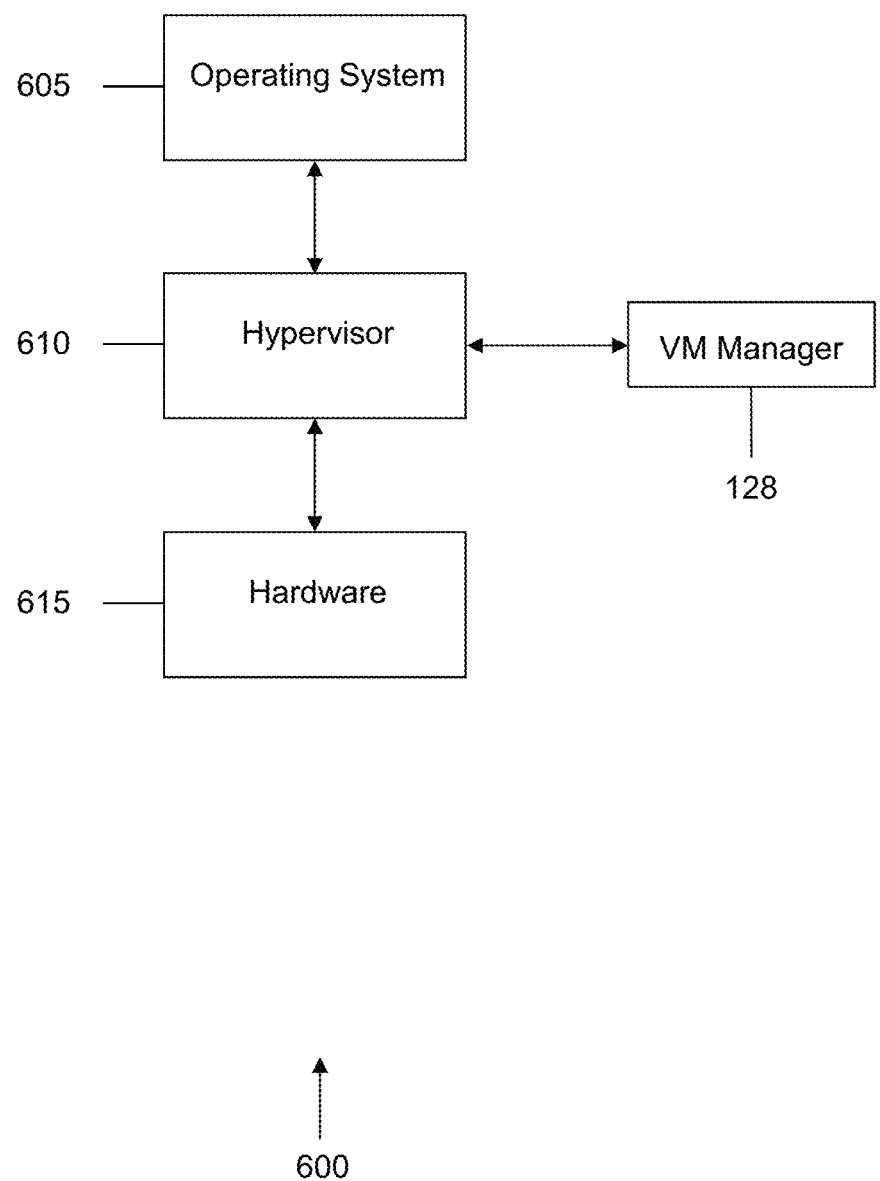
FIG. 6 is a schematic diagram providing an architecture for a virtualization process according to an embodiment of the present disclosure.

The enterprise network 115 may also be configured to connect to network provider network 125, which may be operated by a network provider. In one embodiment, the network provider network 125 may not have access to enterprise data or any information in the enterprise network 115. In certain embodiments, the network provider may be associated with the user, the enterprise network 115, or a combination thereof. The network provider network 125 may include and be connected to a cloud-based network, mobile network, a wireless network, an Ethernet network, a satellite network, a broadband network, a cellular network, any type of private network, a cable network, the Internet 145, an internet protocol network, a multiprotocol label switching (MPLS) network, a content distribution network, or any combination thereof. In further embodiments, the network provider network 125 may be part of a single autonomous system that is located in a particular geographic region, or be part of multiple autonomous systems that span several geographic regions. The network provider network 125 may include one or more servers, such as virtual browser servers 130 and 135. The virtual browser servers 130 and 135 may host virtual machines, such as browser virtual machines, that may be utilized to render and provide virtual browsers to the user device 102. The virtual browser server 130 may include a memory 131 that includes instructions, and a processor 132 that executes the instructions from the memory 131 to perform various operations that are performed by the virtual browser server 130. Similarly, the virtual browser server 135 may include a memory 136 that includes instructions, and a processor 137 that executes the instructions from the memory 136 to perform various operations that are performed by the virtual browser server 135. The processors 132 and 137 may be hardware, software, or a combination thereof. In certain embodiments, the virtual machines may run above a hypervisor, such as hypervisor 610, which is shown in FIG. 6.

A user in the system 100 may utilize the user device 102 to (1) transmit a request to access a resource that is provided by the content source device 150. In some embodiments, the user may utilize a client, which may be a software client to send the request. In certain embodiments, the request may be a hypertext transfer protocol (HTTP) request, or any other type of request. In one embodiment, the request may include an identifier that may be utilized for locating the resource, for referring to the resource, or a combination thereof. For example, the identifier may be a URL, a uniform resource identifier (URI), an internet protocol address, a web address, a string, or any other similar identifier that may be utilized to locate the resource. In certain embodiments, the resource may include, but is not limited to, a website, a software application, a file, audio content, video content, text content, image content, gaming content, any web content, email content, messaging content, any other type of content, and any combination thereof. In certain embodiments, the request to access the resource may be sent via an internet web browser installed on or accessible by the user device 102. In certain other embodiments, the request may be sent via any other type of software application associated with the user device 102. For example, the request may be sent by an email client and server, and a rendering may be sent back to the email client using a similar process as described for the browser implementation described herein. As another example, the request may be sent via a mobile application on the user device 102.

Once the request to access the resource is sent from the user device 102, the request may be received by the transparent network proxy 120. In certain embodiments, the transparent network proxy 120 may be a network proxy, a network server, a router, a gateway, a computer, a mobile device, any other suitable computing device, or a combination thereof. In one embodiment, the transparent network proxy 120 may include a proxy and a categorization service. In another embodiment, the transparent network proxy 120 may include or be connected to a malware threat prevention or detection system. The transparent network proxy 120 may include a memory 121 that includes instructions, and a processor 122 that executes the instructions from the memory 121 to perform various operations that are performed by the transparent network proxy 120. The processor 121 may be hardware, software, or a combination thereof. Once the transparent network proxy 120 receives the request, the transparent network proxy 120 may determine if the resource and/or identifier in the request is not trusted based on an analysis of the identifier.

The resource, identifier, or both may be determined to not be trusted if the identifier and/or resource are determined to be unknown, uncategorized, suspicious, uncommon, known to be malicious, in a blacklist, otherwise untrustworthy, or a combination thereof. For example, the transparent network proxy 120 may determine that the resource, identifier, or both, are not to be trusted if the identifier matches an identifier contained in a blacklist accessible by or stored on the transparent network proxy 120. In certain embodiments, the blacklist may be a list containing identifiers, such as URLs, that are known to be associated with malicious activity, suspicious activity, untrustworthy activity, or any combination thereof. Malicious activity, suspicious activity, and untrustworthy activity may include activities associated with denial-of-service attacks, malware, phishing, computer viruses, computer worms, and the like. The transparent network proxy 120 may determine that the resource, identifier, or both, are not to be trusted even if the identifier does not match an identifier in a blacklist. For example, the transparent network proxy 120 may determine that the resource, identifier, or both, are not to be trusted if the identifier is determined to not have been previously used, determined to have been used less than a predetermined threshold number of times, determined to be attempting to redirect the user's browser to a malicious resource or link, determined to be associated with suspicious activity, or any combination thereof. In certain embodiments, the transparent network proxy 120 may include anti-virus and anti-malware software installed thereon.

The transparent network proxy 120 may determine that the, resource, identifier, or both, should be trusted if the identifier is determined to be an identifier that has been categorized to be safe by the system 100, an identifier that is determined to not be suspicious, an identifier that is not known to be malicious, an identifier that is determined to be common, an identifier that has been determined to have been used more than a threshold number of times, an identifier that is determined to be included within a whitelist, the resource is determined to not be suspicious, the resource is determined to be associated with actions or behaviors that are not suspicious, or a combination thereof. As an example, the transparent network proxy 120 may determine that the resource, identifier, or both should be trusted if the identifier from the request matches an identifier categorized in the whitelist, which may contain a list of identifiers that are known to be safe and trustworthy. If the transparent network proxy 120 determines that the resource, identifier, or both should be trusted, the transparent network proxy 120 may allow the user device 102 to directly access the resource that was requested in the request, which may be provided by the content source device 150. For example, as shown in the data path (1-2-3) with the dashed arrows in FIG. 1, if the transparent network proxy 120 determines that the identifier is a URL that is known to be safe, then the user device 102 may directly connect with the content source device 150 via the Internet 145 to gain access to the resource associated with the URL. The user device 102 may then render the requested resource within the user's web browser so that the user of the user device 102 may view or otherwise interact with the resource.

However, if the transparent network proxy 120 determines that the resource, identifier, or both should not be trusted, then the transparent network proxy 120 may provide an option to the user of the user device 102 to access the resource using secure browsing. The data path that may be utilized in this scenario may be data path 1-4-5-6, as shown in FIG. 1. For example and referring to FIG. 3, a sample web browser 300 that the user may be using on the user device 102 is illustratively shown. The web browser 300 may include a graphical user interface 305, which may include a viewable window 310, a web address bar 315, a control bar 320 that includes controls for the web browser 300, a cancel button 325, and a secure browsing button 330. If the user device 102 sends a request to access the URL, http://www.thisisanunknownurl.com, the transparent network proxy 120 may determine that the URL should not be trusted because the URL is unknown or untrustworthy. As a result, instead of allowing the user device 102 to directly access the resource at the URL, the system 100 may cause the web browser 300 to display a warning web page within the viewable window 310 that includes information indicating that the URL is untrustworthy. The web page within the viewable window 310 may provide the user with the option to cancel the user's request to load the URL if the user is unfamiliar with the resource (e.g. website) associated with the URL. The user may cancel the user's request by selecting the cancel button 325, by closing the web browser 300, or by otherwise choosing not to proceed. Additionally, the web page displayed within the viewable window 310 may provide the user with an option to securely browse the URL and the resource associated with the URL. If the user wants to proceed with secure browsing of the URL, the user may select the secure browsing button 330 to proceed.

If the user ultimately selects the option to securely browse the URL and resource, the transparent network proxy 120 may forward the request received from the user device 102 to a virtual machine manager 128 in the network provider network 125 for further processing. The virtual machine manager 128 may be a software application, computing device, or a combination thereof, that manages a pool of virtual machines, such as browser virtual machines, within the network provider network 125. In one embodiment, the virtual machine manager 127 may include the functionality of a hypervisor. Once the request made by the user device 102 is forwarded to the virtual machine manager 128 by the transparent network proxy, the virtual machine manager 128 may select a browser virtual machine from the pool of browser virtual machines to assist in fulfilling the request. The browser virtual machines may be software applications that are configured to execute on one or more servers of the network provider network 125, such as virtual browser servers 130 and 135. In another embodiment, instead of having the virtual machine manager 128 select the browser virtual machine, a load balancer or name resolver may be utilized to select the browser virtual machine. In certain embodiments, the load balancer or name resolver may select the browser virtual machine based on loads experienced by each browser virtual machine in the pool, based on network conditions, and based on usage conditions.

Once the browser virtual machine is selected from the pool of browser virtual machines, the selected browser virtual machine may connect with the content source device 150 using the identifier in the forwarded request. When the selected browser virtual machine is connected to the content source device 150, the browser virtual machine may access the resource from the content source device 150. In one embodiment, the selected browser virtual machine may analyze the resource to filter out any content that may be malicious, suspicious, or otherwise untrustworthy. The browser virtual machine may download the portions of the resource that have not been filtered (i.e. safe to download). For example, if the resource is a web page of a website and the selected browser virtual machine determines that a video on the web page is infected, the selected browser virtual machine may download all of the portions of the web page, except the infected video. In another embodiment, the selected browser virtual machine may download the entire resource even if a portion of the resource is infected. In this scenario, the selected browser virtual machine may download the resource and may utilize anti-virus functionality to neutralize any downloaded malware once downloaded. In yet another embodiment, the selected browser virtual machine may utilize a strategy of accepting infection of the browser virtual machine by the resource in order to create a rendering of the resource for the user of the user device 102. In the aforementioned embodiment, once the rendering of the resource is created and streamed to the user device 102, the browser virtual machine may be destroyed and then replaced with a new browser virtual machine from a golden image that is associated with the browser virtual machine. In one embodiment, since the virtual browser may be in a physically separate browser virtual machine from the user device 102, the system 100 may not need to determine if the browser virtual machine is infected because the user device 102 will still be uncompromised.

Once the resource is accessed or downloaded, the browser virtual machine may render the resource and stream the rendered resource to the user device 102. In one embodiment, the selected browser virtual machine may only stream the portions of the resource that have been determined to be free from infection, malware, or suspicion. If the browser virtual machine becomes infected by the resource or otherwise, the browser virtual machine may ensure that infected portions of the resource are not streamed to the user device 102. Even if the infected portions are streamed to the user, the user device 102 may still be unaffected since the actual resource may not be directly provided to the user. In certain embodiments, before the rendered resource is streamed to the user device 102, the transparent network proxy 120 or any other selected device of the system 100 may redirect the web browser of the user device 102 to a desktop virtualization connection or session, such as a remote-desktop connection, with the selected browser virtual machine. The desktop virtualization connection may utilize any desktop virtualization protocols, may utilize the functionality of the virtual machine manager 128, and may enable the user's web browser to directly access the desktop environment and applications associated with the selected browser virtual machine, which may be executing on virtual browser server 130, virtual browser server 135, or both.

Once the desktop virtualization connection is established between the user's browser and the selected browser virtual machine, the browser virtual machine may stream the rendered resource associated with the URL, along with a virtual browser and user controls for the virtual browser, to the user's browser. In one embodiment, the control bar, address, bar, and other selected features of the virtual browser may be removed from the virtual browser prior to streaming the virtual browser to the user's web browser. As a result, in one embodiment, strictly the viewable window of the virtual browser, which may include the rendering of the resource, may be streamed to the user's browser. Once the user's browser receives the stream including the virtual browser and the rendered resource, the rendered resource and virtual browser may be displayed or otherwise presented within a portion of the user's browser, such as in the viewable window 310, using the desktop virtualization connection. Additionally, in certain embodiments, the user may utilize the controls in the control bar 320 to control the virtual browser displayed within the viewable window 310 as if the virtual browser was the user's normal web browser. Since the virtual browser executes on the browser virtual machine, the software that is run to render the resources executes on the browser virtual machine, and any malware downloaded from the resource may only be installed on the browser virtual machine, any attacks attempting to compromise the user device, enterprise data, or both, will be rendered useless. Furthermore, the use of the desktop virtualization connection may ensure that only the rendered resource from the browser virtual machine is displayed on the user device 102, and may ensure that no malware can traverse the desktop virtualization connection back to the user's device 102. As a result, even if a browser virtual machine itself is compromised by malware, the browser virtual machine may not be utilized to propagate the infection to the user device 102. Thus, the system 100 may provide the user with a similar and seamless user experience as if the user was directly accessing the resource using the user's browser without the use of the browser virtual machine and virtual browser, while also ensuring that the user device 102 does not become compromised or infected.

After the user is finished accessing the rendered resource and the virtual browser that is streamed to the user's browser, the user may decide to close the user's browser or a tab of the user's browser. When the user's closes the user's browser or the tab displaying the rendered resource and virtual browser, the selected browser virtual machine may be rebooted and released back into the pool of browser virtual machines so that the selected browser virtual machine may be selected for a different secure browsing session. Additionally, a selected browser virtual machine may be rebooted from a fresh image after rendering each page of the rendered resource, and, as a result, the selected browser virtual machine may not have any persistent malware. Additionally, the browser virtual machine may be configured using special techniques, such as preventing unknown software from executing, that may prevent malware from altering the browser virtual machine. Furthermore, by using the system 100, the user's Internet web browsing experience may not be affected, and the usage of the virtual browser may be transparent.

Notably, any of the functionality and features of the system 100 may be supported by using internal resource server 110. In one embodiment, the internal resource server 110 may include a memory 111 that includes instructions, and a processor 112 that executes the instructions from the memory 111 to perform various operations that are performed by the internal resource server 110. The processor 112 may be hardware, software, or a combination thereof. In certain embodiments, the internal resource server 110 may be, but is not limited to, a network server, a router, a gateway, a computer, a mobile device, or any other suitable computing device. In a further embodiment, the internal resource server 110 may reside within the enterprise network 115.

Additionally, the database 155 of the system 100 may be utilized to store and relay information that traverses the system 100, cache content that traverses the system 100, store data about each of the devices in the system 100, and perform any other typical functions of a database. In one embodiment, the database 155 may be connected to or reside within the network provider network 125. However, in certain embodiments, the database 155 may be connected to or reside within the enterprise network 115. Additionally, the database 155 may include a processor and memory or be connected to a processor and memory to perform the various operation associated with the database 155. In certain embodiments, the database 155 may be connected to the virtual browser servers 130 and 135, the user device 102, the network proxy 120, the internal resource server 110, the server 160, any other selected device, or any combination thereof. The database 155 may also store blacklists containing identifiers associated with malicious destinations or resources, update the blacklists to include new identifiers that are determined to be malicious, update the whitelists to include identifiers that are known to be trusted, store information relating to or processed by the transparent network proxy 120, store information relating to the content source device 150, store information associated with the virtual browsers, store information relating to the virtual machine manager 128, store information relating to the requests traversing the system 100, or store any other information in the system 100. Furthermore, the database 155 may be configured to process queries sent to it by any device in the system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving the request from the user device 102 to access the resource, determining if the identifier in the request is not trusted or is trusted, forwarding the requesting to the virtual machine manager 128, selecting a browser virtual machine, rendering the resource, redirecting the user's browser to a desktop virtualization connection with the selected browser virtual machine, streaming the resource and virtual browser, displaying the rendered resource and virtual browser, rebooting the selected browser virtual machine, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a user device 102, an internal resource server 110, a transparent network proxy 120, a virtual browser server 130, a virtual browser server 135, a content source device 150, and a database 155. However, the system 100 may include multiple user devices 102, multiple internal resource servers 110, multiple transparent network proxies 120, multiple virtual browser servers 130 and 135, multiple content source devices 150, multiple databases 155, or any number of any of the other components in the system 100. Furthermore, in one embodiment, substantial portions of the functionality and operations of the system 100 may be performed by other networks and systems that are connected to system 100.

Figure 2:
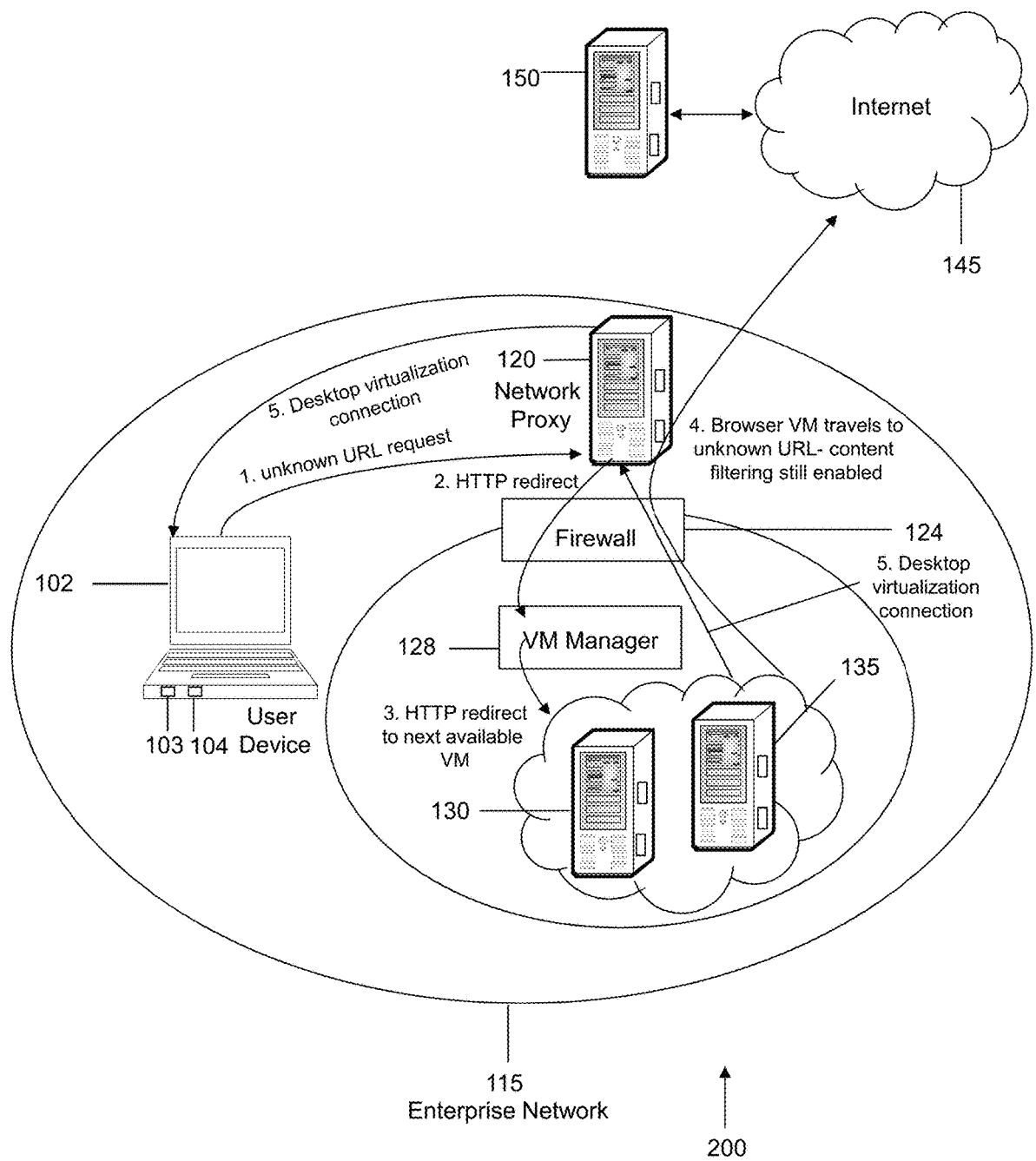
FIG. 2 is a schematic diagram of a system for providing secure browsing via a transparent network proxy according to another embodiment of the present disclosure.
Figure 3:
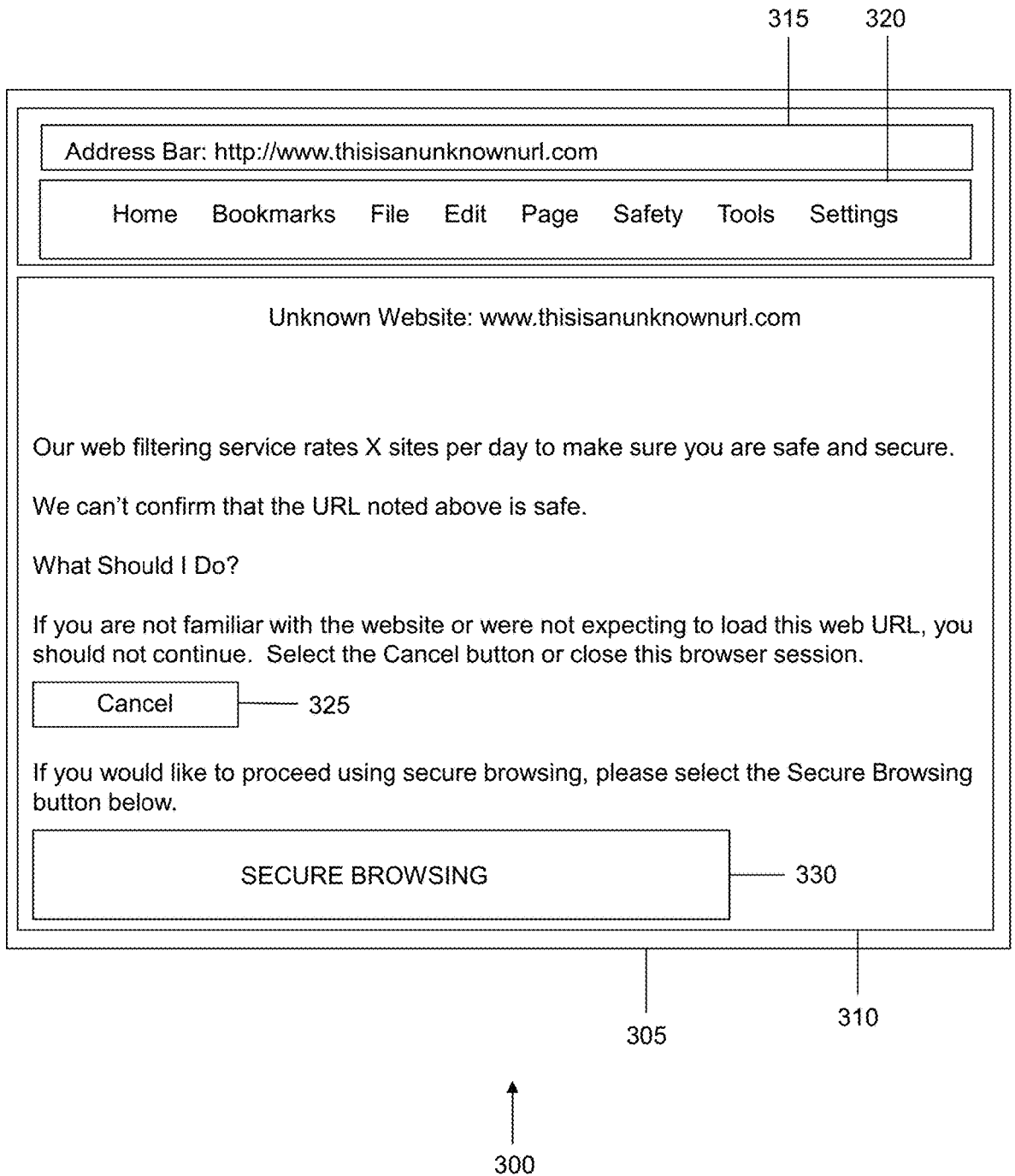
FIG. 3 is a sample web page that may be displayed on a user device of a user that has sent a request to access a resource that is determined to be uncategorized or not trusted.

Referring to FIG. 2, a system 200 for providing secure browsing via the transparent network proxy 120 is disclosed. The system 200 may include any of the devices and features in the system 100. For example, the system 200 may include the user device 102, the enterprise network 115, the transparent network proxy 120, the virtual machine manager 128, the virtual browser servers 130 and 135, the Internet 145, and the content source device 150. However, in system 200, the virtual machine manager 128 and the virtual browser servers 130 and 135 may reside behind a firewall 124 of the enterprise network 115, instead of being in a separate network provider network 125. The firewall 124 may be a software or hardware-based network security system, which monitors and controls incoming and outgoing traffic based on rules established by the firewall 124. The firewall 124 may be utilized to keep the virtual machine manager 128 and the virtual browser servers 130 and 135 separate from the rest of devices and information in the enterprise network 115. In one embodiment, the virtual machine manager 128 and the virtual browser servers 130 and 135 may not have any access to enterprise data and information relating to the user device 102.

Notably, the system 200 may incorporate any of the features of functionality of system 100 and may provide users with a same or similar virtual browsing experience as provided by system 100. For example, the user device 102 may (1) transmit a request to access a resource provided by the content source device 150; (2) the transparent network proxy 120 may determine that a URL and resource associated with the request is untrusted, and, based on the determination, forward the request to the virtual machine manager 128; (3) a browser virtual machine may be selected for rendering the resource; (4) the selected browser virtual machine may obtain the untrusted resource associated with the URL from the content source device 150, perform content filtering on the untrusted resource, and render the untrusted resource; and (5) the selected browser virtual machine may establish a desktop virtualization connection between the selected browser virtual machine and the user device 102 to provide the rendered resource over the desktop virtualization connection to the user device 102.

Figure 4:
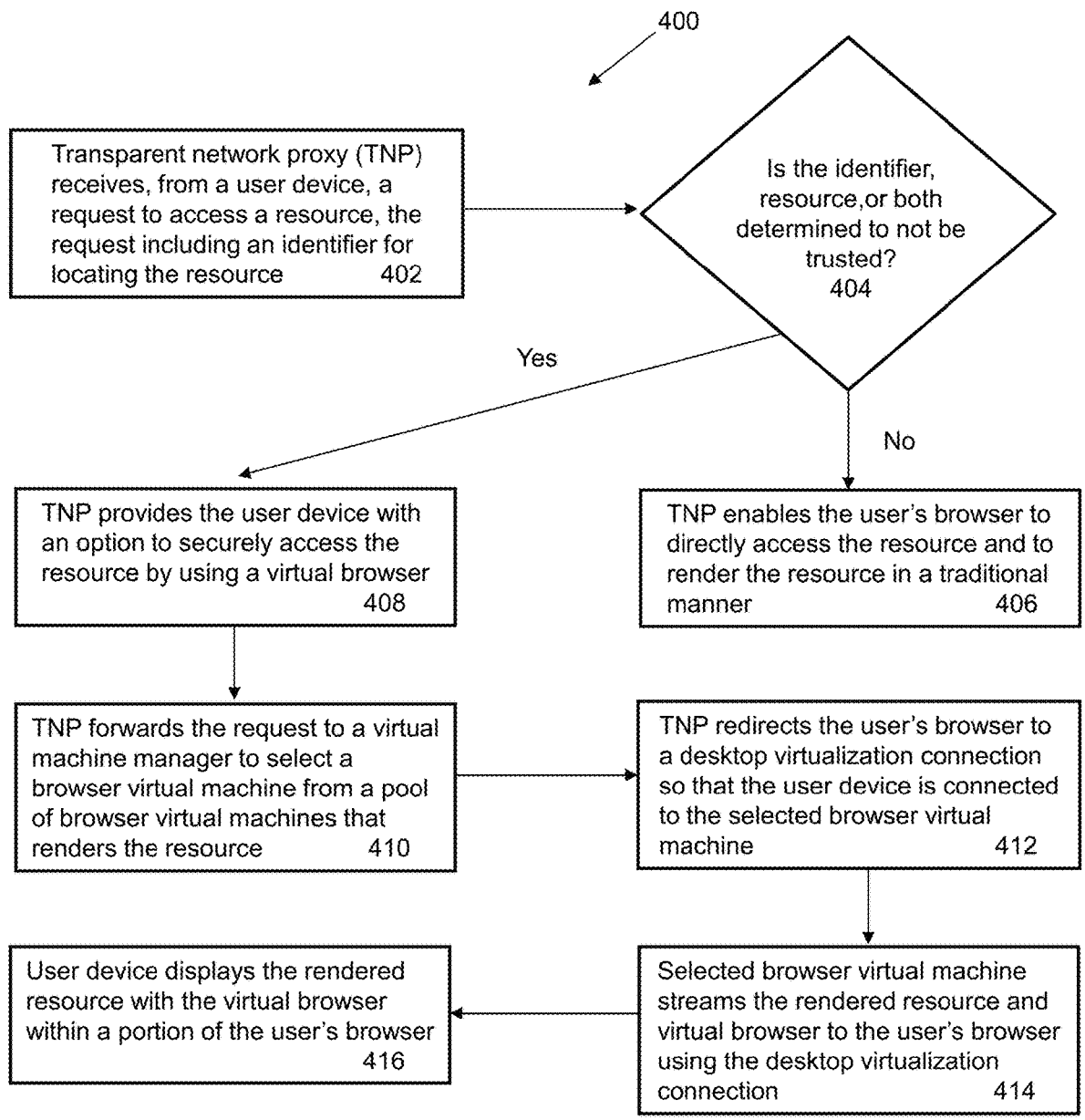
FIG. 4 is a flow diagram illustrating a sample method for providing secure browsing via a transparent network proxy according to an embodiment of the present disclosure.

As shown in FIG. 4, an exemplary method 400 for providing secure browsing via the transparent network proxy 120 is schematically illustrated, and may include, at step 402, having the transparent network proxy 120 receive, from a user device 102, a request to access a resource. The request to access the resource may include an identifier for locating the resource. In one embodiment, the receiving of the request to access the resource may be performed by the transparent network proxy 120, the internal resource server 110, the server 160, any combination thereof, or any other appropriate device. At step 404, the method 400 may include determining if the resource, identifier, or both are not to be trusted. In one embodiment, the determination may be performed by the transparent network proxy 120, the server 160, the internal resource server 100, any combination thereof, or any other appropriate device. If the resource, identifier, or both are determined to be trusted, the method 400 may include, at step 406, enabling the user's browser to directly access the requested resource and to render the resource in the user's browser as the user's browser would normally do. In one embodiment, the enablement of access may be performed by the transparent network proxy 120, the server 160, the internal resource server 100, any combination thereof, or any other appropriate device.

If the resource, identifier, or both are determined to not be trusted, the method 400 may include, at step 408, providing the user device 102 with an option to securely access the resource by using a virtual browser. In one embodiment, the option may be provided by the transparent network proxy 120, the server 160, the internal resource server 100, any combination thereof, or any other appropriate device. At step 410, the method 400 may include forwarding the request to a virtual machine manager to select a browser virtual machine from a pool of browser virtual machines. In another embodiment, instead of having the virtual machine manager 128 select the browser virtual machine, a load balancer or name resolver may be utilized to select the browser virtual machine. In certain embodiments, the load balancer or name resolver may select the browser virtual machine based on loads experienced by each browser virtual machine in the pool, based on network conditions, and based on usage conditions. In one embodiment, the forwarding may be performed by the transparent network proxy 120, the server 160, the internal resource server 100, any combination thereof, or any other appropriate device. The selected browser virtual machine may access the resource by using the identifier and may render the resource, such as by utilizing virtual browser servers 130 and 135. At step 412, the method 400 may include redirecting the user's web browser to a desktop virtualization connection so that the user device 102 may be connected to the selected virtual browser machine. In one embodiment, the redirection may be performed by the transparent network proxy 120, the server 160, the internal resource server 100, any combination thereof, or any other appropriate device.

At step 414, the method 400 may include streaming the rendered resource and the virtual browser to the user's browser by utilizing the desktop virtualization connection. In one embodiment, the streaming may be performed by the selected browser virtual machine, the virtual browser servers 130 and 135, the transparent network proxy 120, the server 160, the internal resource server 100, any combination thereof, or any other appropriate device. At step 416, the method 400 may include displaying the rendered resource and virtual browser within a portion of the user's web browser. In one embodiment, the displaying may be performed by the user device 102 or by any other appropriate device. It is important to note that the methods described above may incorporate any of the functionality, devices, and/or features of the system 100, the system 200, and subsystems described above, or otherwise, and are not intended to be limited to the description or examples provided herein.

In certain embodiments, the system 100, the system 200, and the methods described herein may further include additional functionality and features. In one embodiment, if the transparent network proxy 120 determines that the resource is not to be trusted, the transparent network proxy 120 may automatically forward the user's request to the virtual machine manager 128 without having to provide the warning web page or having to present the user with the option to securely browse or access the resource requested in the request. In certain embodiments, the virtual machines may be utilized to simulate any type of software application, such as, but not limited to, a mobile application, and is not intended to be limited to virtualizing a web browser. For example, the virtual machines may be configured to render resources that may be presented within mobile applications, and the virtual machines may render a portion of the mobile application to the user device 102. In one embodiment, the transparent network proxy 120 may update the blacklist and the whitelist with new identifiers as the system 100 or 200 analyzes and categorizes identifiers that are received in requests. In one embodiment, if a user is currently accessing a rendered resource and virtual browser within the user's browser because the resource was determined to be malicious or suspicious and then the user wants to access a resource that is known to be trusted, the user may then switch to using their normal web browser without having to use the virtual browser. If the user then wants to access a resource that is not to be trusted, then the user's browser may switch back to using a virtual browser.

In one embodiment, the user may utilize authentication information, such as a username and password, to log into the selected browser virtual machine and trigger the rendering of the requested resource. In another embodiment, the virtual browser technology may be utilized in any type of web browser or software application that may be utilized to access internet content and information. In another embodiment, the system 100, the system 200, and the methods may include utilizing a browser virtual machine download directory. The browser virtual machine download directory may be utilized to store resources that are obtained from the content source device 150 or elsewhere. The resources may be scanned and monitored by the transparent network proxy 120 and/or the browser virtual machine, and the user may be provided access to the download directory if the resources are deemed to be trusted. In addition, further security techniques or extra processing, such as anti-malware detection, may be applied to the items in the download directory. In one embodiment, the user may only be provided with read-only access to the download directory. In another embodiment, if the resources and identifiers are deemed to be trusted, the system 100, the system 200, and the methods may include allowing the user to download resources stored in the download directory or to directly download the resources from the content source device 150.

In one embodiment, the system 100, the system 200, and methods may include including a feedback form, which may be presented on a web page that may be sent to the user device 102. The feedback form may be utilized to obtain feedback from the user of the user device 102 relating to the user's virtual browsing experience. The feedback may include, but is not limited to including, what type of resource they user was accessing, whether the identifiers and resources should be trusted or not, whether the determination made by the transparent network proxy 120 regarding the trustworthiness of the identifier is accurate or not, whether the virtual browser was effective in rendering the requested resource to the user, or any other type of feedback. The system 100, the system 200, and the methods may adjust any determinations or operations conducted in the system 100, system 200, and methods based on the feedback. In another embodiment, the system 100, the system 200, and the methods may include utilizing an import mechanism that is accessible by the user device 102 and the transparent network proxy 120. The import mechanism may be a program that may be utilized to download requested resources, and to scan the downloaded resources. Additionally, the system 100, the system 200, and the methods may include an export mechanism, which may be utilized by the user of the user device 102 to upload files, content, and information to the rendered virtual browser provided by the browser virtual machine. The export mechanism may be configured to prevent confidential information from being uploaded. For example, the export mechanism may prevent social security numbers, financial information, or other personal information from being uploaded. In one embodiment, the system 100, the system 200, and methods described herein may further include utilizing any of the various components described in the system 100 and system 200 to perform the operative functions disclosed herein.

Figure 5:
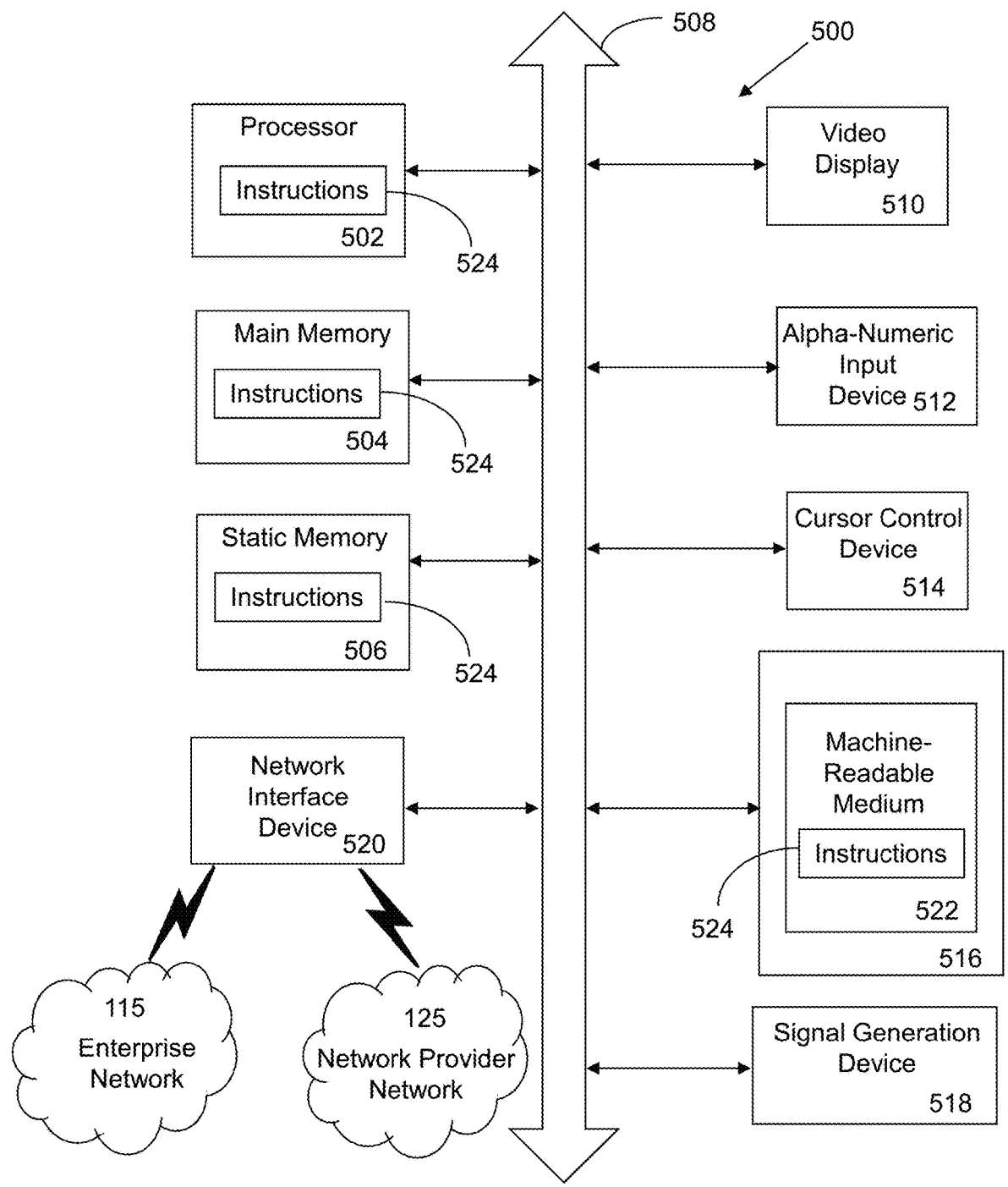
FIG. 5 is a schematic diagram of a machine in the form of a computer system within which a set of instructions, when executed, may cause the machine to perform any one or more of the methodologies or operations of the systems and methods for providing secure browsing via a transparent network proxy.

Referring now also to FIG. 5, at least a portion of the methodologies and techniques described with respect to the exemplary embodiments of the system 100, the system 200, or a combination thereof, can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100, the system 200, or a combination thereof. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using enterprise network 115, network provider network 125, the internet 145, another network, or a combination thereof) to and assist with operations performed by other machines, such as, but not limited to, user device 102, internal resource server 110, network proxy 120, virtual browser servers 130 and 135, database 155, or any combination thereof. The machine may be connected with any component in the system 100, the system 200, or a combination thereof. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. Moreover, in certain embodiments, the machine may be virtualized through technology, such as the hypervisor 610, and may not have specific physical attributes. Such embodiments may be preferred in certain instances. For example, if the machine becomes corrupted by malware on occasion, virtualizing the machine may make it easier to dispose of an existing machine, and to replace it with a new copy of the machine.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 522 containing instructions 524 so that a device connected to the enterprise network 115, the network provider network 125, the internet 145, other network, or a combination thereof, can send or receive voice, video or data, and to communicate over the enterprise network 115, the network provider network 125, the internet 145, other network, or a combination thereof, using the instructions. The instructions 524 may further be transmitted or received over the enterprise network 115, the network provider network 125, the internet 145, other network, or a combination thereof, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; virtual memories, disk images, or other self-contained information archive or set of archives is considered a distribution medium equivalent to a tangible storage medium. The "machine-readable medium" or "machine-readable device" may be non-transitory. Accordingly, the disclosure is considered to include any one or more of a machine-readable medium or a distribution medium, as listed herein and including art-recognized equivalents and successor media, in which the software implementations herein are stored.

Referring now also to FIG. 6, an architecture 600 for providing virtualization processes according to an embodiment of the present disclosure is shown. The architecture 600 may include an operating system 605, the hypervisor 610, the virtual machine manager 128, and hardware 615. The operating system 605 may be an operating system associated with virtual browser servers 130 and 135, and the hardware 615 may correspond with virtual browser servers 130 and 135, or any other selected device of the system 100. The architecture 600 may support virtualization techniques that may be facilitated through the use of the hypervisor 610, which may be utilized to create the virtual machines contemplated in the present disclosure. The hypervisor 610, in conjunction with the virtual machine manager 128, may allow the system 100, system 200, and methods disclosed herein to more easily replace the operating system 605 and the virtual machines. As an example, the virtual machine manager 128 may select an image of a browser virtual machine to run, and may load the image into the hypervisor 610. This may allow for browser virtual machines to be replaced in a rapid fashion. Furthermore, the virtual browser may be a set of browser virtual machines that reside above the hypervisor 610, which may include the operating system 605 and a browser running within them.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
    a non-transitory memory that stores instructions;
    a computer processor that executes the instructions to perform operations, the operations comprising:
        determining that a resource is not trusted based on an analysis of an identifier included with a request from a browser to access the resource, wherein the determining that the resource is not trusted comprises determining that the resource is not trusted based on determining that the identifier has not been previously used;
        filtering, by utilizing a browser virtual machine, malicious content from the resource; and
        streaming, based on the request and after the filtering of the malicious content from the resource, a rendering of a viewable window of a virtual browser rendering the resource from the browser virtual machine to the viewable window of the browser, wherein controls in a control bar of the browser are utilized to control the virtual browser displayed within the viewable window of the browser.

2. The system of claim 1, wherein the operations further comprise removing a virtual browser control bar from the virtual browser.

3. The system of claim 2, wherein the virtual browser is generated by the browser virtual machine to which the browser is redirected.

4. The system of claim 1, wherein the operations further comprise locating the resource based on the identifier included with the request.

5. The system of claim 1, wherein the operations further comprise enabling the browser to directly access the resource if the resource is determined to be trusted.

6. The system of claim 1, wherein the operations further comprise providing an option to securely access the resource by using the virtual browser.

7. The system of claim 1, wherein the operations further comprise forwarding the request to a virtual machine manager to select the browser virtual machine from a pool of browser virtual machines.

8. The system of claim 1, wherein the operations further comprise selecting the browser virtual machine based on a load experienced by each browser virtual machine in a pool of browser virtual machines.

9. The system of claim 1, wherein the operations further comprise selecting the browser virtual machine based on a usage condition associated with each browser virtual machine in a pool of browser virtual machines.

10. The system of claim 1, wherein the operations further comprise selecting the browser virtual machine based on a network condition associated with each browser virtual machine in a pool of browser virtual machines.

11. The system of claim 1, wherein the operations further comprise redirecting the browser to a desktop virtualization connection to connect the browser to the browser virtual machine.

12. The system of claim 1, wherein the operations further comprise utilizing the browser virtual machine to simulate a selected software application.

13. The system of claim 12, wherein the operations further comprise rendering a different resource associated with the selected software application by utilizing the browser virtual machine.

14. A method, comprising:
    determining, by utilizing instructions from a memory that are executed by a processor, that a resource is not trusted based on an analysis of an identifier included with a request from a browser to access the resource, wherein the determining that the resource is not trusted comprises determining that the resource is not trusted based on determining that the identifier has not been previously used;
    filtering, by utilizing a browser virtual machine, malicious content from the resource; and
    streaming, after the filtering of the malicious content from the resource, a rendering of a viewable window of a virtual browser rendering the resource from the browser virtual machine to the viewable window of the browser, wherein controls in a control bar of the browser are utilized to control the virtual browser displayed within the viewable window of the browser.

15. The method of claim 14, further comprising facilitating switching between the virtual browser and the browser.

16. The method of claim 14, further comprising enabling a user associated with the request to log into the browser virtual machine and trigger the rendering of the resource.

17. The method of claim 14, further comprising obtaining feedback from a device associated with the request, wherein the feedback relates to an experience associated with use of the virtual browser, the browser virtual machine, or a combination thereof.

18. The method of claim 14, further comprising locating the resource based on the identifier included with the request.

19. The method of claim 14, further comprising providing an option to securely access the resource by using the virtual browser.

20. A non-transitory computer-readable device comprising instructions, which when loaded and executed by a processor, cause the processor to perform operations, the operations comprising:
    determining that a resource is not trusted based on an analysis of an identifier included with a request from a browser to access the resource, wherein the determining that the resource is not trusted comprises determining that the resource is not trusted based on determining that the identifier has not been previously used;
    filtering, by utilizing a browser virtual machine, malicious content from the resource; and
    streaming, based on the request and after the filtering of the malicious content from the resource, a rendering of a viewable window of a virtual browser rendering the resource from the browser virtual machine to the viewable window of the browser, wherein controls in a control bar of the browser are utilized to control the virtual browser displayed within the viewable window of the browser.

* * * * *